US006631671B1

(12) United States Patent
Vool

(10) Patent No.: US 6,631,671 B1
(45) Date of Patent: Oct. 14, 2003

(54) PISTON-TYPE MACHINE WITH CONROD-FREE MECHANISM

(76) Inventor: Aleksey Feliksovich Vool, 37, uLVatufina, app.30, Donatsk, 340015 (UA)

( * ) Notice: Subject to any disclaimer, the term of this patent is extended or adjusted under 35 U.S.C. 154(b) by 0 days.

(21) Appl. No.: 09/936,091

(22) PCT Filed: Mar. 6, 2000

(86) PCT No.: PCT/UA00/00007

§ 371 (c)(1),
(2), (4) Date: Sep. 7, 2001

(87) PCT Pub. No.: WO00/53894

PCT Pub. Date: Sep. 14, 2000

(30) Foreign Application Priority Data

Mar. 9, 1999 (UA) .......................................... 99031278

(51) Int. Cl.$^7$ ................................................. F16J 15/18
(52) U.S. Cl. ........................................ 92/165 R; 74/50
(58) Field of Search ........................ 92/165 R, 165 PR; 74/50, 570

(56) References Cited

U.S. PATENT DOCUMENTS

| | | | | |
|---|---|---|---|---|
| 684,745 | A | * 10/1901 | Carey ......................... | 92/165 R |
| 4,318,446 | A | * 3/1982 | Livesay ....................... | 74/570 |
| 4,550,501 | A | * 11/1985 | Moores et al. .................. | 74/50 |
| 4,559,838 | A | * 12/1985 | Neuenschwander ............ | 74/50 |

* cited by examiner

Primary Examiner—F. Daniel Lopez
(74) Attorney, Agent, or Firm—Weiner & Burt, P.C.; Irving M. Weiner; Pamela S. Burt

(57) ABSTRACT

The present invention pertains to the field of piston machines, mainly those that include a mechanism without any connecting rod for converting the reciprocating movement of the pistons into a rotating movement of the output shaft. This invention essentially relates to a piston machine that includes a mechanism without any connecting rod and that comprises the following members: a body (1) with a plurality of cylinders (2); a plurality of pistons (5) with piston rods (6); sliding members (13) formed on the rods (6); a plurality of guides for the sliding members (13), each connected to the body (1) and capable of displacing the corresponding sliding member (13) along the axis of the corresponding cylinder (2); two coaxial cranked shafts (7) mounted in the body (1); and a crankshaft (10) mounted between the cranked shafts (7) and having its main journals (11) connected to said cranked shafts (7) while the rod journals (12) are connected to the corresponding piston rods (6). This machine is characterised in that each guide is made in the form of an annular member (14) comprising guiding surfaces (15). Each annular member (14) is mounted in the body (1) so as to be coaxial relative to the cranked shafts (7) and so as to be capable of rotation about the axes (16) of said cranked shafts (7), and also comprises means for fixing its position relative to the body (1). This structure ensures the automatic adjustment of the sliding member (13) guides into an optimal position relative to the axes of the corresponding cylinders (2) during the engine assembly, which prevents engine seizure.

1 Claim, 5 Drawing Sheets

PISTON-TYPE MACHINE WITH CONROD-FREE MECHANISM

FIELD OF INVENTION

The invention relates to piston-type machines, and particularly to machines provided with a conrod-free mechanism intended for transforming the translational motion of pistons to the rotary motion of an output shaft.

The term "conrod" as used herein means "connecting rod".

Hereinafter the term "machine" means a device that is capable of performing functions of both an engine and a pump. The term "engine" means a device intended for transforming the energy of a working fluid to the mechanical energy, and particularly internal combustion engines, steam engines, hydraulic engines etc. The term "pump" means a device intended for forcing or compressing fluids by mechanical means, and particularly both pumps for fluids and compressors for forcing compressible media, i.e. gases or vapors.

The inventive solution relates to a piston-type machine in the general meaning thereof, and may be used both in engines and in pumps.

BACKGROUND OF THE INVENTION

Well-known in the art is the kinematic layout of the slider-crank mechanism, implementing a conrod-free mechanism intended for transforming the translational motion of pistons to the rotary motion of an output shaft. The layout comprises a housing member provided with two cylinders with mutually perpendicular axes; pistons with piston rods; sliders provided on piston rods; slider guide members; a carrier member, and an intermediate member engaged in rotary pairs with rods and with the carrier member.

In the course of reciprocal motion of pistons, the intermediate member pivotally connected to cylinder rods and the carrier member, carries out a complicated plane-parallel motion, thereby providing relationship between the motion of pistons and the rotation of the carrier member, with transformation of the reciprocal motion of pistons to the rotary motion of the carrier member without the use of connecting rods.

The above kinematic layout serves as a base for development of a conrod-free internal combustion engine known as "Balandin engine" (S. S. Balandin, Conrod-free Internal Combustion Engines, Moscow, Mashinostroyenie, 1968, pp.14–15). This engine comprises a housing member provided with cylinders; pistons with piston rods; sliders provided on piston rods; slider guide members each being connected to the housing member and made for displacing a corresponding slider along the axis of a corresponding cylinder; two coaxial carrier members mounted inside the housing member, and a crankshaft disposed between the carrier members, main journals of the above crankshaft being pivotally connected to carrier members, and rod pins, to relevant piston rods.

In the course of reciprocal motion of pistons, the crankshaft that is pivotally connected to cylinder rods and carrier members, carries out a complicated planetary motion by rotating around its own axis and the axis of carrier members, and provides the relationship between the reciprocal motion of the pistons and the rotation of the carrier members, with transformation of the reciprocal motion of pistons to the synchronous rotary motion of the carrier members without the use of connecting rods. Here, the main journals of the crankshaft are moving along a circle with a radius equal to ¼ stroke of the pistons, while pistons and rods connected to the rod pins of the crankshaft are carrying out only the rectilinear reciprocal motion along the stroke of pistons, without exerting any lateral thrust against cylinder walls. This mechanism may be used not only for internal combustion engines, but also for driven compressors, pumps, piston gas generators, and other piston-type machines. The engine with a similar kinematic layout is also described in SU, A1, 118471.

In the course of practical implementation of the above devices, there occurs the problem of design of guide members that would permit, when assembling the engine, to adjust these guide members to a position ensuring a coordinated motion of pistons inside cylinders and sliders/rods in the guide members without any distortions and jamming of the mechanism. This problem acquires a critical importance from the standpoint of the technological effectiveness of assembling of a piston machine, particularly a multicylinder piston machine.

Also known in the art is a piston-type machine disclosed in the specification to SU, A1, 1216271. This machine comprises a housing member provided with cylinders and having an axial hole; liners mounted inside the cylinders; pistons with piston rods, disposed inside the liners; sliders provided on piston rods; slider guide members each provided for displacement of a corresponding slider along the axis of a corresponding cylinder; two coaxial carrier members mounted inside the housing member, and a crankshaft disposed inside the axial hole of the housing member between the carrier members, main journals of the above crankshaft being connected to carrier members, and rod pins, with relevant piston rods. Slider guide members are made integrally with the liners and constitute an extension of the internal surface of the liner. That is, each of the guiding surfaces for a corresponding slide comprises a structural member of a corresponding liner, in which the guiding surface for the slider constitutes an extension of the internal surface of the liner.

The reciprocal motion of pistons in this known piston-type machine is transformed, through the rods with sliders moving within guide members, to the planetary rotary motion of the crankshaft that is pivotally connected to the rods and carrier members. The planetary motion of the crankshaft causes synchronous rotary motion of the carrier members. During machine operation in the engine mode, the power may be picked up from any carrier member or from an additional shaft being in kinematic relationship with the carrier members and providing synchronization of the rotary motion of the carrier members.

In this case, guide members for sliders are made non-adjustable. The accuracy of location of the guiding surfaces is ensured in the process of liner manufacture, since the slider guide members are made integral with the liners, constitute the extension of the liner internal surface, and are made in a single run.

However, in this embodiment of the piston-type machine the distance between the guiding surfaces restricting the displacement of each slider should not exceed the diameter of liners since the guiding surfaces of sliders constitute the extension of the liners internal surfaces comprising guiding surfaces for the pistons. From this, it follows that in the above design which inevitably provides the planetary motion of the crankshaft within the limits of the distance between the guiding surfaces of sliders, there exist restrictions for the eccentricity of a crankshaft, and hence for the stroke length of each piston. This circumstance substantially restricts the possibilities of using the above design in piston-type machines since it does not permit to provide a required ratio between the cylinder.diameter and the value of piston stroke length. It is of special importance in the designs of internal combustion engines, and particularly in diesel engines.

Known in the prior art are designs of piston-type machines provided with adjustable guide members of piston rods. Thus, known in the art is a crank mechanism of a piston type machine, disclosed in SU, A1, 1513259. This mechanism comprises a housing member with a cylinder; a piston with a piston rod; a slider provided on the piston rod; a slider guide member connected to the housing member and provided for slider displacement along the cylinder axis; a carrier member; and a con-rod pivotally connected to the slider and to the journal of the carrier member. Naturally, in a multipiston machine the above crank mechanism is repeated for each piston group. The slider guide member is shaped as a platelet mounted on the housing member for displacement and fixation in a selected position by means of screws and nuts. Suspended from this platelet by means of bolts and disk springs is a clamp member provided with solids of revolution. The solids of revolution are mounted on the clamp member for interaction with flat contact surfaces provided on the slider.

In this mechanism, the reciprocal motion of the piston is transformed to the rotary motion of the crankshaft via the rod provided with a slider that is moving in the guide member, and then via the con-rod. Here, flat contact surfaces of the slider interact with the solids of revolution that are fastened to the clamp member, transmitting the forces created thereby via disk springs and platelet to the housing member. In case of a need to adjust the position of a guide member, the platelet is moved by means of screws to a required position with respect to the housing member, following which the platelet is fixed in the selected position by means of nuts.

In the above design, the procedure of setting the guide members supposes manual adjustment of each guide member to the required position with respect to the axes of relevant cylinders and contact surfaces of sliders; therefore, under real conditions of assembling a piston-type machine it is practically impossible to attain a required accuracy of setting all the guide members to prevent jamming of the mechanism. In addition, the presence of console components and threaded joints in the power chain of the guide member restricts the use of the guide member under consideration under conditions of high dynamic loads, particularly in internal combustion engines, and especially in diesel engines.

Known in the art are practical designs of conrod-free internal combustion engines constructed in accordance with the "Baiandin design". (S. S. Balandin, Conrod-free Internal Combustion Engines, Moscow, Mashinostroyenie, 1968, pp.28–75). These include a four-cylinder engine developed for the purpose of testing major kinematic and design properties of the conrod-free layout and performance of the conrod-free power mechanism in the engine system under actual loads, as well as standardized conrod-free engines having 140 to 400 hp power rating. Page 39 of this book contains the description of a four-cylinder, four-stroke gasoline engine of the aircraft type. This known engine comprises a housing member provided with cylinders, a front portion, a medium portion, and a back lid. The front portion accommodates the carrier member of a conrod-free mechanism, transmitting the engine power to a consumer, and a gas distribution mechanism. Mounted in the back lid is another carrier member of the conrod-free mechanism. The medium portion accomodates, between carrier members, a crankshaft with rods of the conrod-free mechanism. Main (extreme) journals of the crankshaft are connected to carrier members, and rod pins, to relevant piston rods. Each rod is provided with a slider that is mounted in guide members. Each guide member is connected to the housing member and is made for displacing a relevant slider along the axis of a corresponding cylinder. All the parts of the engine are connected therebetween by studs. Guide members for each slider are made as two separate segments, each segment being provided with a guiding surface and fastened to the housing member by means of bolted joints so that the guiding surfaces of the above segments, when being situated in parallel, form a guiding structure that ensures the motion of a corresponding slider along the axis of a relevant cylinder. Adjustment of guide members and provision of accuracy of such adjustment are carried out by hand, in the process of assembling, by fitting each segment to corresponding contact surfaces of sliders in a certain position, followed by fastening of segments to the housing member by means of bolted joints.

During the working cycle, each piston carries out reciprocating motion within a corresponding cylinder. Piston rods are moving together with pistons; in so doing, rod sliders are moving in the guide members through which they transfer resulting lateral loads to the housing member. Piston rods, being in the pivoted joint with the crankshaft, put it in the planetary motion during which the crankshaft rotates around its axis and around the axis of carrier members, thereby putting in the rotary motion the carrier members; each of these carrier members can be the output shaft of the engine.

The above design is complicated to assemble since it is required to fit each guiding segment, thereby ensuring the parallel arrangement of the guiding surfaces of segments and their orientation relative to the axes of corresponding cylinders. Precise adjustment of all the guiding segments, minimizing the probability of mechanism jamming, in this embodiment is extremely difficult and under real conditions of assembling a piston-type machine with conrod-free mechanism is practically unattainable.

BRIEF DESCRIPTION OF THE INVENTION

The invention is based upon the object to develop an improved piston-type machine with conrod-free mechanism, in which design features would provide the possibility of self-adjustment of slider guide members to an optimal position relative to axes of corresponding cylinders in the course of assembling, thereby reducing the probability of jamming of the mechanism, improving the technological effectiveness of the resulting device, and substantially simplifying the assembling process.

The object set forth is attained in that in a piston-type machine with conrod-free mechanism, comprising a housing member provided with cylinders; pistons with piston rods; sliders provided on piston rods; slider guide members each being connected to the housing member and made for displacing a corresponding slider along the axis of a corresponding cylinder; two coaxial carrier members mounted inside the housing member, and a crankshaft disposed between the carrier members, main journals of the above crankshaft being pivotally connected to carrier members, and rod pins, to relevant piston rods, according to the invention, each guide member is made as a ring-shaped member with guiding surfaces, each ring-shaped member being mounted within, the housing member in coaxial relationship with carrier members for rotating around the axis of said carrier members, and provided with means for fixing position thereof relative to the housing member.

In the preferred embodiment of the invention, the guiding surfaces on each ring-shaped member may be formed by parallel surfaces of a groove provided in the diametral direction on one of the side surfaces of the ring-shaped member for displacement of the slider along said groove.

The means for fixing each ring-shaped member relative to the housing member are expedient to be provided as a screw joint, wherein a threaded hole is disposed in the ring-shaped member and the screw is mounted in a corresponding hole provided in the housing member, the diameter of said hole exceeding the diameter of said screw by 1.02 to 1.2 times.

In addition, it is also expedient to provide the means for fixing each ring-shaped member as a screw joint, wherein said threaded hole is disposed in the housing member and the screw is mounted in a hole provided in the ring-shaped member, the diameter of said hole exceeding the diameter of said screw by 1.02 to 1.2 times.

Providing slider guide members as ring-shaped elements, mounting the ring-shaped members within the housing member in coaxial relationship with carrier members for rotation around the axis of carrier members, and fixing position thereof relative to the housing member ensures the possibility of self-adjustment of the slider guide members relative to the axes of corresponding cylinders. In the process of assembling the inventive machine, the mounting of carrier members, crankshaft, pistons with piston rods, and slider guide members is followed by the motoring of the mechanism, during which the ring-shaped guide members, while rotating in mounting seats thereof around the axis of carrier members, independently occupy the most optimal position to prevent the jamming of the mechanism, following which they are fastened inside the housing member with the use of available means for fixing.

BRIEF DESCRIPTION OF DRAWINGS

The inventive piston-type machine with conrod-free mechanism is further described in more detail and with reference to the accompanying drawings, in which.

BEST EMBODIMENT OF THE INVENTION

Figure 1:
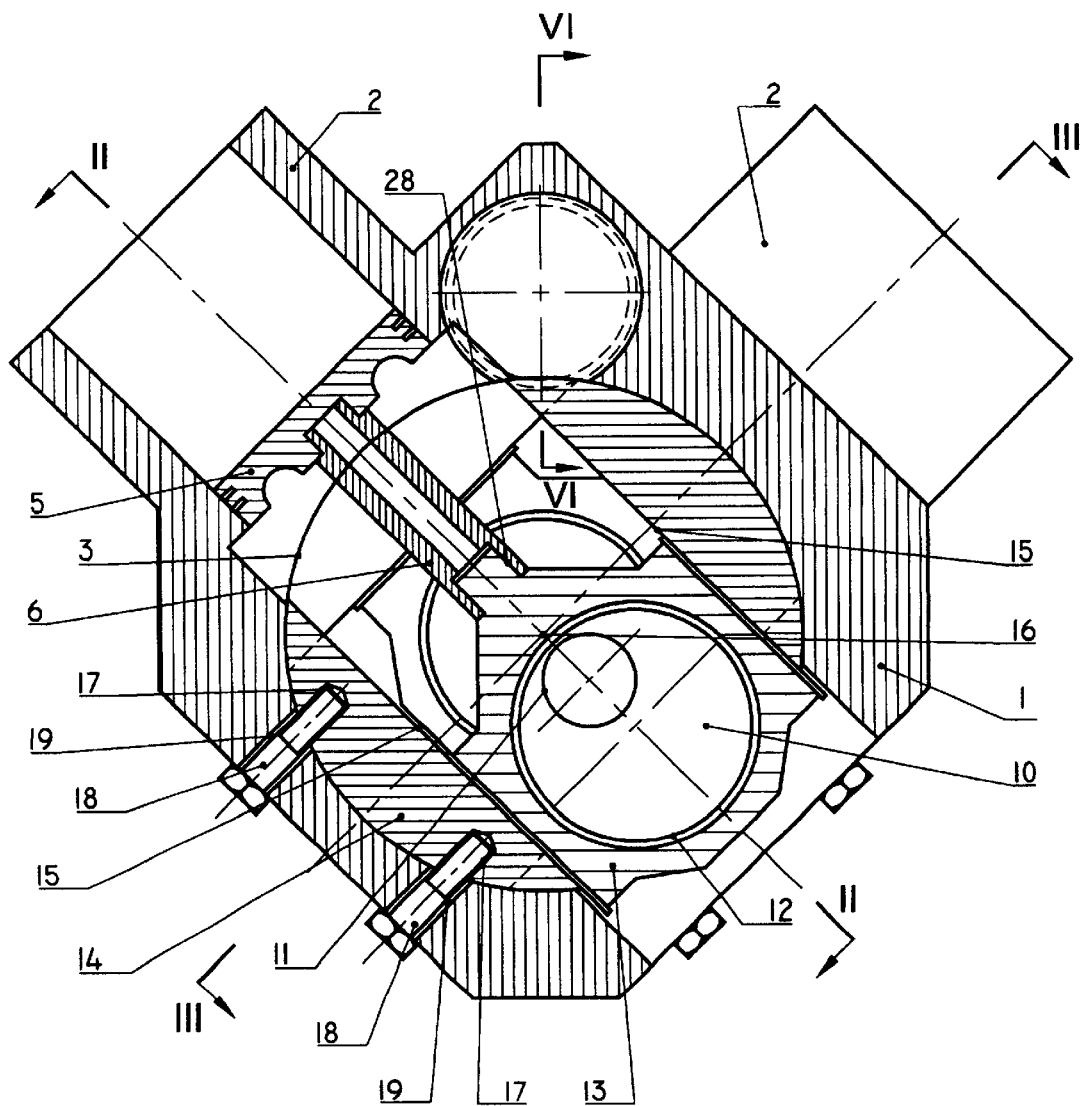
FIG. 1 is a general view of the inventive piston-type machine with conrod-free mehanism, cross-section.
Figure 2:
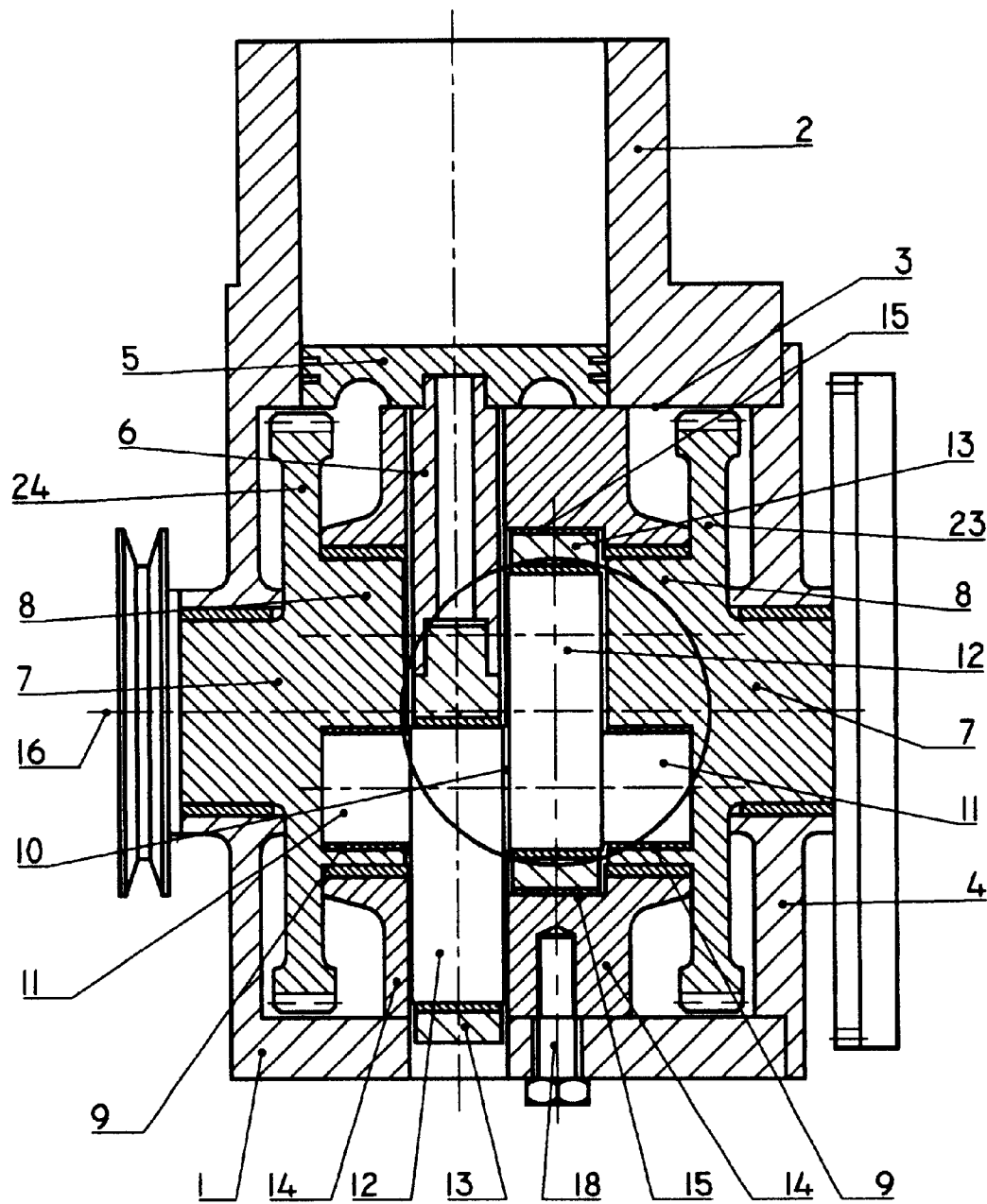
FIG. 2 is section II—II of the piston-type machine with conrod-free mechanism, shown in FIG. 1.
Figure 3:
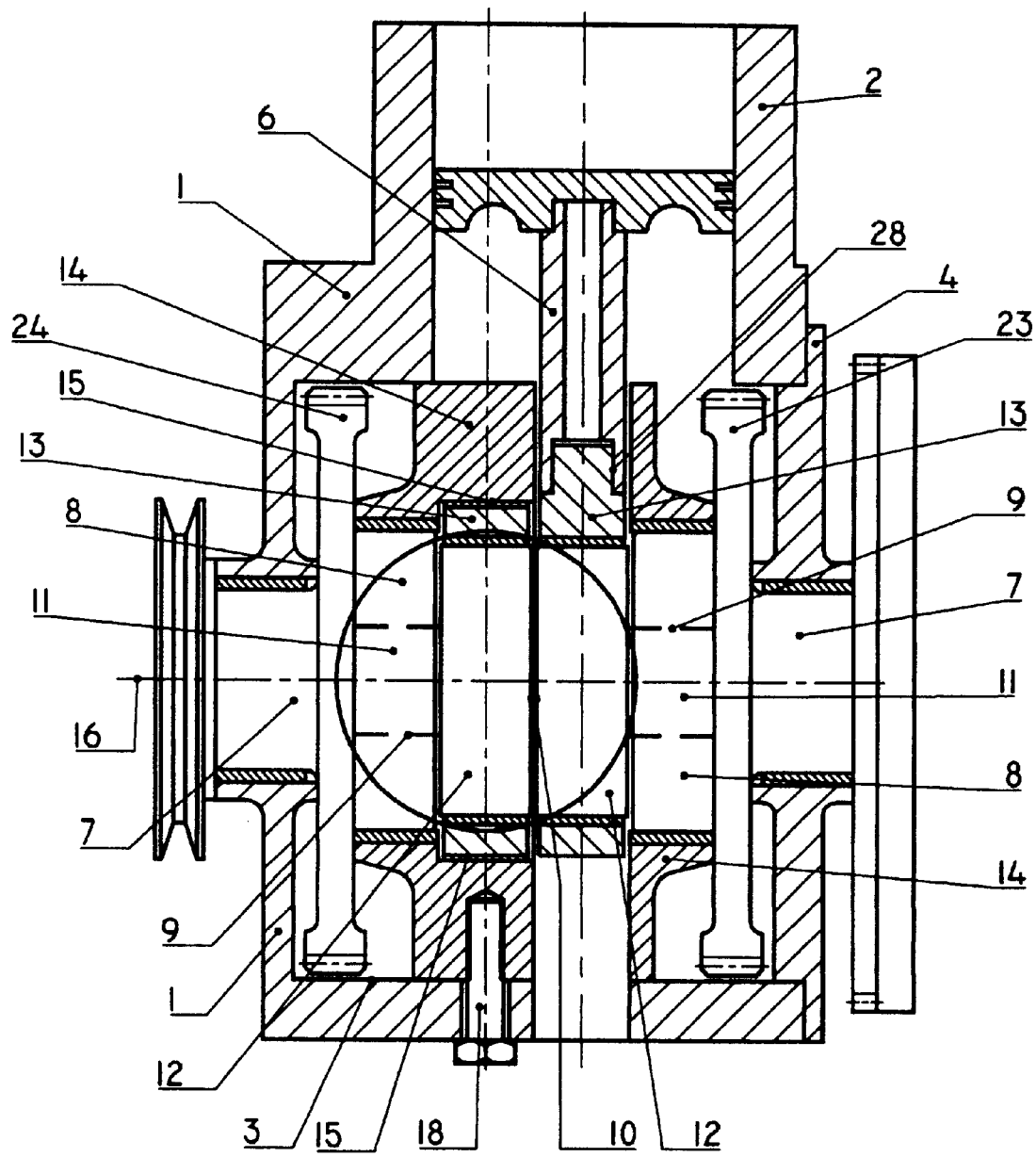
FIG. 3 is section III—III of the piston-type machine with conrod-free mechanism, shown in FIG. 1.
Figure 4:
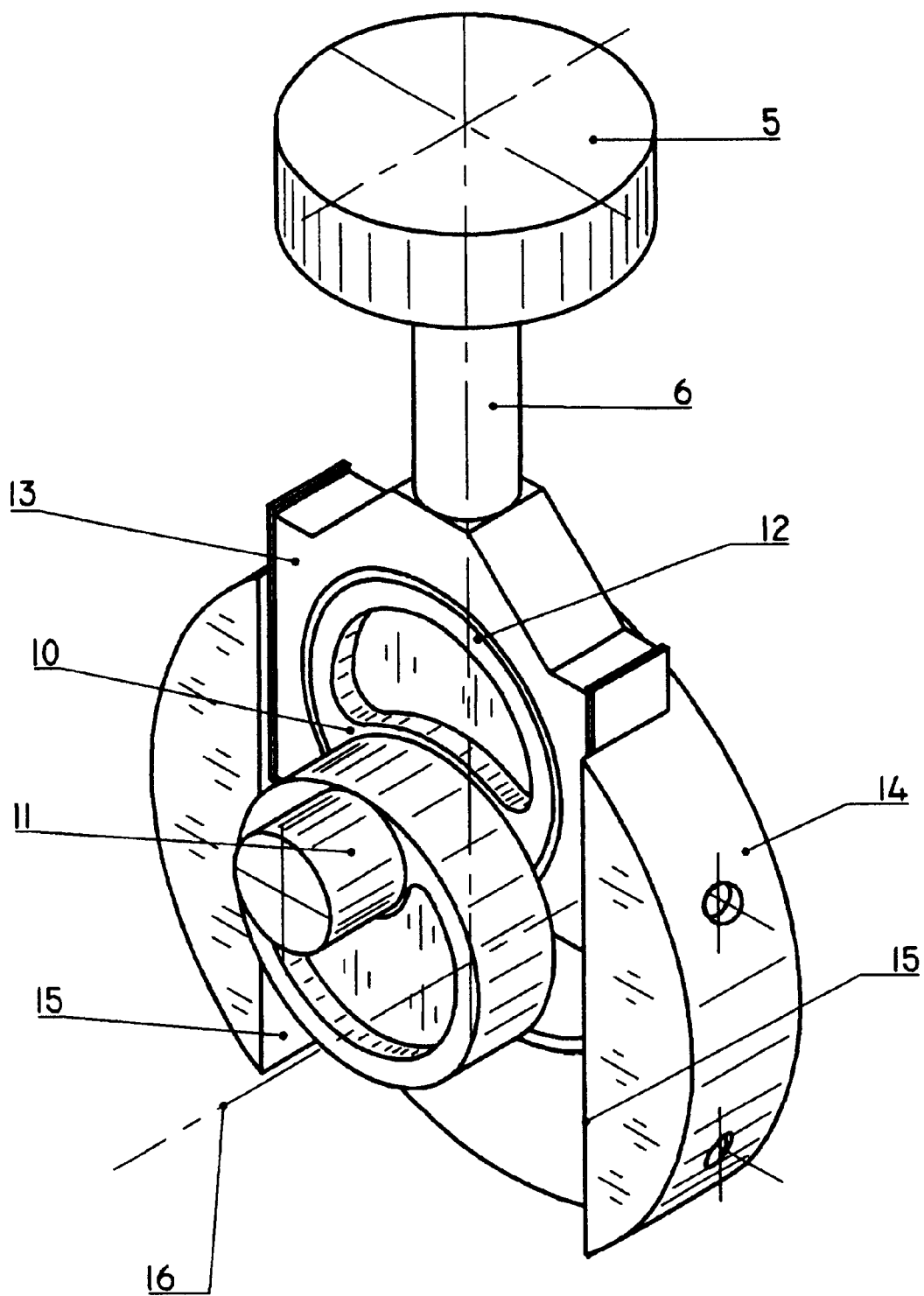
FIG. 4 is a three-dimensional view of the piston group.
Figure 5:
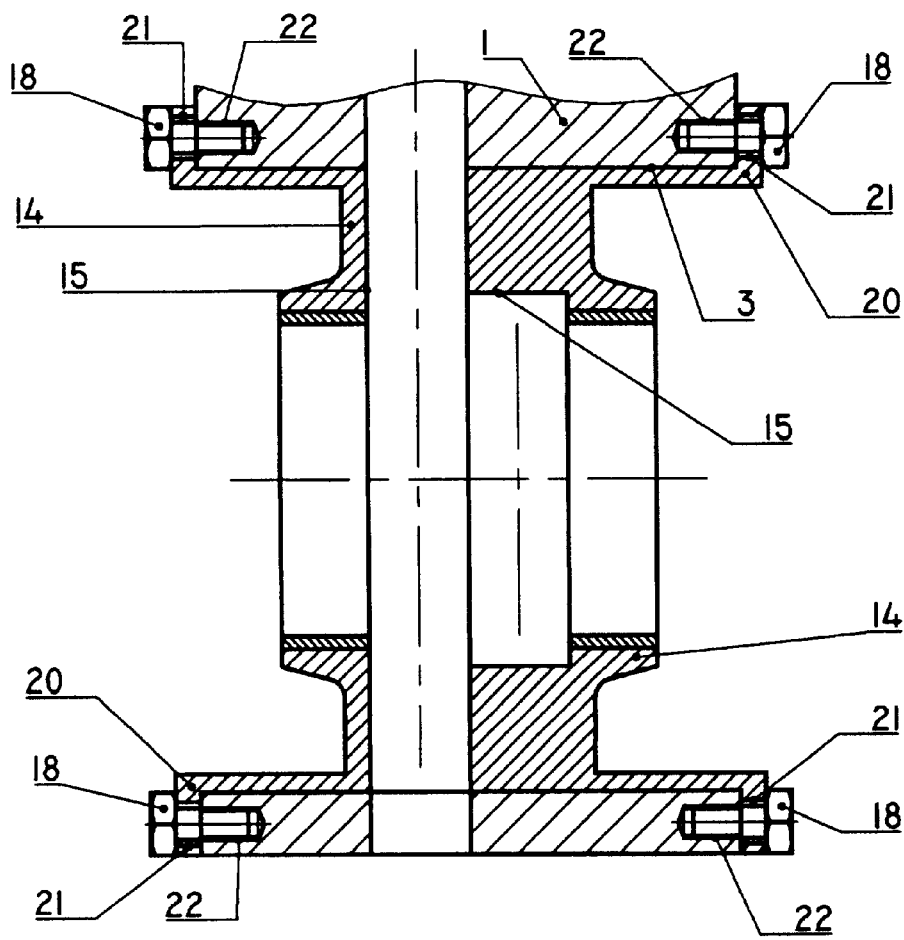
FIG. 5 is an embodiment of the means for fixing guide members.
Figure 6:
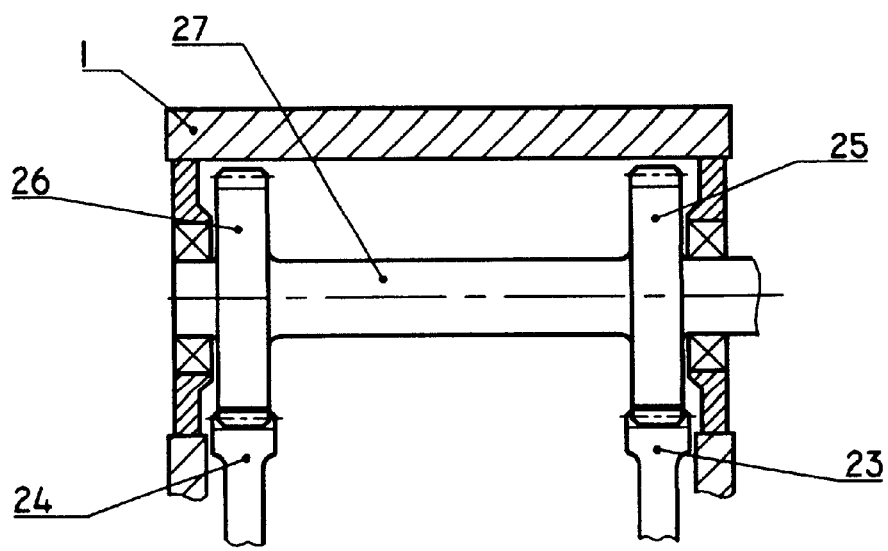
FIG. 6 is section VI—VI of the piston-type machine with conrod-free mechanism, shown in FIG. 1.

As it is shown in FIGS. 1 through 4, the inventive piston-type machine with conrod-free mechanism comprises housing member 1 provided with cylinders 2, tunnel hole 3 and flange cover 4, and pistons 5 provided with piston rods 6. Carrier members 7 are coaxially mounted inside housing member 1. Carrier members 7 have bearings 8 and eccentric holes 9. Disposed between carrier members 7 is crankshaft 10 whose crankshaft journals 11 are pivotally connected to carrier members 7 while bearings 12 are pivotally connected to corresponding piston rods 6 via sliders 13 provided on piston rods 6. Each of sliders 13 is mounted in a guide member made in the form of ring-shaped member 14 providing with guiding surfaces 15 made for displacing a corresponding slider 13 along the axis of a corresponding cylinder 2. Each ring-shaped member 14 is connected to housing member 1 for rotation thereof around axis 16 of carrier members 7 and is provided with means for fixing position thereof relative to housing member 1. Guiding surfaces 15 on ring-shaped member 14 are made in the form of a groove disposed diametrically on one of the sides of ring-shaped member 14 for displacement of slider 13 also said groove. Means for fixing each ring-shaped member 14 relative to housing member 1 are made in the form of a screw joint wherein threaded hole is made in ring-shaped member 14 and screw 18 is mounted in hole 19 provided in housing member 1 whose diameter exceeds the diameter of screw 18 by 1.02 to 1.2 times. Also possible is the embodiment of the screw joint where in ring-shaped member 14 are provided with flanges 20 (FIG. 5) having holes 21 for mounting screws 18, and threaded holes 22 are made in housing member 1. Carrier members 7 are provided with gear rings 23, 24 that are in engagement with pinions 25, 26. Pinions 25, 26 are connected to synchronizing shaft 27 (FIG. 6). The presence of synchronizing shaft 27 in the machine design ensures synchronous rotation of carrier members 7 and prevents jamming of crankshaft 10 in its pivoted joints with carrier members 7. Piston rods 6 are connected to sliders 13 by means of threaded joint 28.

The procedure used for assembling the piston-type machine is as follows. Each of sliders 13 is mounted between guiding surfaces 15 of ring-shaped members 14. Crankshaft 10 is placed in the hole of one slider and the first of carrier members 7 is mounted so as to ensure location of bearing 8 of carrier member 7 within the mounting seat of ring-shaped member 4, and crankshaft journal 11 of crankshaft 10, inside eccentric hole 9 of carrier member 7. Following this, successively disposed on crankshaft 10 are other sliders 13 in assembly with ring-shaped member 14 serving as guides. Then the second carrier member 7 is mounted with the use of the same rules of assembling as those used for mounting the first carrier member 7. Sliders 13 are disposed within guiding surfaces 15 so that they do not protrude beyond the limits of the maximum diameter of ring-shaped member 14. The thus assembled parts are mounted into tunnel hole 3 in housing member 1. In so doing, ring-shaped members 14 are disposed in corresponding mounting seats provided in housing member 1, for rotation around axis 16 of carrier members 7. After this, flange cover 4 is mounted. Screws 18 are mounted into threaded holes 19 or 22 (second option) without tightening. Sliders 13 are connected to piston rods 6 by means of threaded joint 28. Then synchronizing shaft 27 is mounted so that pinion 25, 26 come into engagement with gear rings 23, 24 of carrier members 7. Following this, the motoring of the mechanism is carried out, during which ring-shaped guide member 14, being the guide of sliders 13, are self-adjusted and occupy the optimal position relative to the axes of cylinders 2, wherein the probability of jamming of the mechanism is minimal. Position of ring-shaped member 13 is fixed by tightening screws 18. The mechanism is ready for operation. mounting seat of ring-shaped member 4, and main journal 11 of crankshaft 10, inside eccentric hole 9 of carrier member 7. Following this, successively disposed on crankshaft 10 are other sliders 13 in assembly with ring-shaped members 14 serving as guides. Then the second carrier member 7 is mounted with the use of the same rules of assembling as those used for mounting the first carrier member 7. Sliders 13 are disposed within guiding surfaces 15 so that they do not protrude beyond the limits of the maximum diameter of ring-shaped members 14. The thus assembled parts are mounted into tunnel hole 3 in housing member 1. In so doing, ring-shaped members 14 are disposed in corresponding mounting seats provided in housing member 1, for rotation around axis 16 of carrier members 7. After this, flange cover 4 is mounted. Screws 18 are mounted into threaded holes 19 or 22 (second option) without tightening. Sliders 13 are connected to piston rods 6 by means of threaded joint 28. Then synchronizing shaft 27 is mounted so that pinions 25, 26 come into engagement with gear rings 23, 24 of carrier members 7. Following this, the motoring of the mechanism is carried out, during which ring-shaped guide members 14, being the guide of sliders 13, are self-adjusted and occupy the optimal position relative to the axes of cylinders 2, wherein the probability of jamming of the mechanism is minimal. Position of ring-shaped members 13 is fixed by tightening screws 18. The mechanism is ready for operation.

The piston-type machine a conrod-free mechanism operates as follows.

During the working cycle, each piston 5 carries out reciprocating motion within a corresponding cylinder 2. Piston rods 6 provided with sliders 13 are moving together with pistons 5; in so doing, sliders 13 of piston rods 6 are moving between guiding surfaces 15 of ring-shaped members 14 through which they transfer resulting lateral loads to housing member 1. Piston rods 6, being in the pivoted joint with crankshaft 10, put it in the planetary motion during which crankshaft 10 rotates around its axis and around axis 16 of carrier members 7, thereby putting in the rotary motion carrier members 7. Synchronization of the rotation of carrier members 7 is carried out by means of synchronizing shaft 27 connected to pinions 25, 26 that are in engagement with gear rings 23, 24 of carrier members 7. Engine power may be picked up from any carrier member 7 or from synchronizing shaft 27. During operation of the piston-type machine in the engine mode, the energy of working fluid supplied to cylinders 2 is transformed to mechanical energy. During operation of the piston-type machine in the pump or compressor mode, forced rotation of carrier members 7 results in injection or compression of fluids by piston groups.

The inventive piston type machine with conrod-free mechanism is characterized by a high technological effectiveness of design and simple procedure of assembling during which slider guide members occupy an optimal position due to their self-adjustment relative to the axes of corresponding cylinders, which fact permits to minimize the probability of mechanism jamming in the operating mode.

INDUSTRIAL APPLICABILITY

The proposed mechanism may be used in a variety of piston-type machines that require high load capacity, high mechanical efficiency, good balance (minimum vibrations), and compactness. First of all, such machines include automotive and aircraft piston-type engines, and particularly diesel engines, marine and locomotive diesels, engines of farming, construction, and other kinds of machinery.

What is claimed is:

1. A piston-type machine comprising:

a housing member provided with cylinders;

pistons with piston rods operatively associated with said cylinders;

sliders provided on said piston rods;

slider guide members, each being connected to said housing member, for guiding a corresponding one of said sliders along an axis of a corresponding cylinder;

two coaxial carrier members mounted inside said housing member;

a crankshaft disposed between said carrier members;

first bearings of said crankshaft being connected to said carrier members;

second bearings being connected to corresponding piston rod pins;

each said guide member comprises a ring-shaped member with guiding surfaces;

each said ring-shaped member being mounted within said housing member in coaxial relationship with said carrier members for rotating around an axis of said carrier members;

fixing means for fixing the position of said ring-shaped members relative to said housing members;

said fixing means for fixing each said ring-shaped member relative to said housing member comprises a screw joint having a threaded hole provided in said housing member and a screw mounted in a second hole provided in said ring-shaped member; and said second hole having a diameter which exceeds the diameter of said screw by 1.02 to 1.2 times.

\* \* \* \* \*